United States Patent
Ramalingam (10) Patent No.: US 10,114,556 B2
(45) Date of Patent: *Oct. 30, 2018

(54) METHOD AND APPARATUS FOR IMPROVING READ PERFORMANCE OF A SOLID STATE DRIVE

(71) Applicant: INTEL CORPORATION, Santa Clara, CA (US)

(72) Inventor: Anand S. Ramalingam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,072

(22) Filed: Oct. 2, 2017

(65) Prior Publication Data

US 2018/0121092 A1     May 3, 2018

Related U.S. Application Data

(63) Continuation of application No. 14/581,723, filed on Dec. 23, 2014, now Pat. No. 9,778,848.

(51) Int. Cl.
| | |
|---|---|
| *G06F 12/00* | (2006.01) |
| *G06F 3/06* | (2006.01) |
| *G06F 12/02* | (2006.01) |
| *G06F 12/0804* | (2016.01) |

(52) U.S. Cl.
CPC .............. *G06F 3/061* (2013.01); *G06F 3/064* (2013.01); *G06F 3/0656* (2013.01); *G06F 3/0679* (2013.01); *G06F 12/00* (2013.01); *G06F 12/0223* (2013.01); *G06F 12/0246* (2013.01); *G06F 12/0804* (2013.01); *G06F 2212/7201* (2013.01)

(58) Field of Classification Search
None
See application file for complete search history.

(56) References Cited

U.S. PATENT DOCUMENTS

| | | |
|---|---|---|
| 9,778,848 B2 | 10/2017 | Ramalingam |
| 2007/0143560 A1 | 6/2007 | Gorobets |
| 2011/0022778 A1 | 1/2011 | Schibilla et al. |
| 2011/0307646 A1 | 12/2011 | Lee et al. |
| 2012/0254505 A1 | 10/2012 | Chishtie et al. |
| 2014/0006688 A1 | 1/2014 | Yu et al. |
| 2016/0005480 A1 | 1/2016 | Kim et al. |

(Continued)

OTHER PUBLICATIONS

NVM Express, Inc., "NVM Express", Revision 1.2, Nov. 3, 2014, 205 pp.

(Continued)

*Primary Examiner* — Midys Rojas
(74) *Attorney, Agent, or Firm* — Konrad Raynes Davda & Victor LLP; Rabindranath Dutta (57) ABSTRACT

A controller of a solid state drive initiates a repacking of data stored in a non-volatile memory of the solid state drive, wherein refreshing of the data stored in the non-volatile memory of the solid state drive is performed during the repacking of the data stored in the non-volatile memory of the solid state drive. Logical blocks are placed physically contiguously in an increasing order in pre-erased locations of the non-volatile memory of the solid state drive while the data stored in the non-volatile memory of the solid state drive is being repacked.

20 Claims, 9 Drawing Sheets

(56) References Cited

U.S. PATENT DOCUMENTS

2016/0154594 A1 6/2016 Kang
2016/0357483 A1 12/2016 Okita et al.

OTHER PUBLICATIONS

Serial ATA International Organization, "Serial ATA Revision 3.2", Aug. 7, 2013, 874 pp. (Submitted in two parts to comply with EFS-Web file size limits—Part A: 142 pp; Part B: 732 pp).
International Search Report and Written Opinion for International Application No. PCT/US2015/062215, dated Mar. 8, 2016, 10 pp.
International Preliminary Report on Patentability for International Application No. PCT/US2015/062215, dated Jul. 6, 2017, 7 pp.
Office Action 1 for U.S. Appl. No. 14/581,723, dated Jan. 30, 2017, 17 pp.
Response to Office Action 1 for U.S. Appl. No. 14/581,723, dated May 1, 2017, 10 pp.
Notice of Allowance 1 for U.S. Appl. No. 14/581,723, dated Jun. 2, 2017, 5 pp.

Representation of data in SSD
(Repacking data with rearrangement for LBA adjacency)

510 — 0
512 — 1
514 — 2

} 502

Repacking data with rearrangement for LBA Adjacency — 504

} 506

516 — 0    518 — 1    520 — 2

Magnified view of 16KB SSD page size — 521

522          524
526 —

| 4KB block | 4KB block | 4KB block | 4KB block | 4KB block | 4KB block | 4KB block | 4KB block |

Addressed by indirection table / host

Contiguous LBA returned in SSD page size of 16KB
528

METHOD AND APPARATUS FOR IMPROVING READ PERFORMANCE OF A SOLID STATE DRIVE

BACKGROUND

A solid state drive (SSD) is a data storage device that uses integrated circuit assemblies as memory to store data persistently.

NAND SSDs have significant advantage over hard disk drives when it comes to read bandwidth, write bandwidth and random input/output operations. This improved bandwidth typically comes from the ability to engage many NAND dies in parallel during read and write operations.

BRIEF DESCRIPTION OF THE DRAWINGS

Referring now to the drawings in which like reference numbers represent corresponding parts throughout.

DETAILED DESCRIPTION

Many type of SSDs use NAND-based flash memory which retains data without power and is a type of non-volatile storage technology. In a single-level cell (SLC) NAND, each cell may exist in one of two states, and store one bit of information per cell. A multi-level cell (MLC) NAND is a solid-state flash memory that uses multiple levels per cell to allow more bits to be stored using the same number of transistors. A three dimensional (3D) NAND flash is a type of flash memory that stacks multiple layers (e.g., 32 layers) of planar memory cells on top of each other. Without loss of generality, the structure of a 3D NAND flash may be visualized as multiple stacked cookie trays in an oven rack with each cookie in a tray being a memory cell.

NAND is a block based non-volatile memory. NAND-based flash memory SSDs operate on entire blocks of memory. Before writing to a memory cell, the memory cell needs to be erased, which requires the application of a large voltage to the memory cells, which can only happen to an entire memory cell block at once. For example, if 1 KiloByte (KB) of data is to be written to a NAND device in the SSD with an erase block size of 128 KB, the SSD needs to read 127 KB from the target block, erase the block and write the old data plus the new data back into the block. SSD firmware may pre-erase blocks and try to write new data into these pre-erased blocks. Existing SSDs have mechanisms for "data refresh", where in data refresh the data is rewritten periodically to prevent data loss due to charge loss in NAND cells.

In the following description, reference is made to the accompanying drawings which form a part hereof and which illustrate several embodiments. It is understood that other embodiments may be utilized and structural and operational changes may be made.

In certain situations, the desirable capacity for SSDs is around 200 GB. A 200 GB SSD can include 25 8 GB MLC NAND dies. With certain 3D NANDs the storage capacity per 3D NAND die may be significantly more than 8 GB, such as 48 GB per 3D NAND die when TLC is used in the 3D NAND die. This may mean that a 200 GB SSD may have only 5 48 GB 3D NAND dies. The increase in the capacity of the NAND dies from 8 GB to 48 GB reduces the NAND parallelism available to the SSD by a factor of 5. Both read and write bandwidth get a bit lower per die as the lithography keeps shrinking. The net result for this example is that bandwidth per die is reduced for both reads and writes compounded by a five times reduction in concurrency.

NAND SSDs are efficient for random read operations. With page sizes becoming bigger and concurrency getting reduced and Tread (time associated with reading) doubling (between 100s for TLC and 80s for MLC), there may be a twenty fold reduction in read operations per second.

Existing NAND controller technology is based on having several NAND dies to perform reads and writes in parallel. The mechanisms for such existing NAND controllers may not always focus on optimizing available NAND bandwidth per die but instead may focus on maximizing endurance per die. With certain high density 3D NAND, a 200 GB SSD may have only 5 3D NAND dies. This SSD with 5 3D NAND dies may have 10 years of endurance (i.e., useful life) assuming 20 GB/day of host writes and an internal write amplification of 3 (60 GB of NAND writes/day by the SSD). This endurance is far more than what may be needed for the 3 to 5 years of typical useful life of the SSD as the rest of the components in the SSD may have a life time of between 3 years to 5 years.

Certain embodiments provide mechanisms that help maximize the per die read bandwidth that is visible to a host coupled to a SSD while making a trade off in the endurance of the SSD. In such embodiments, the performance of read operations is enhanced. In such embodiments, a repacking of data is performed with rearrangement of the data for logical block address (LBA) adjacency while at the same time refreshing the data in the SSD. In an embodiment of an SSD with 3D NAND devices that supports planar parallelism with a 16 KB page size and 4 planes, a performance that is 1600% of the performance of an embodiment in which 4 KB scattered content is stored may be achieved.

Figure 1:
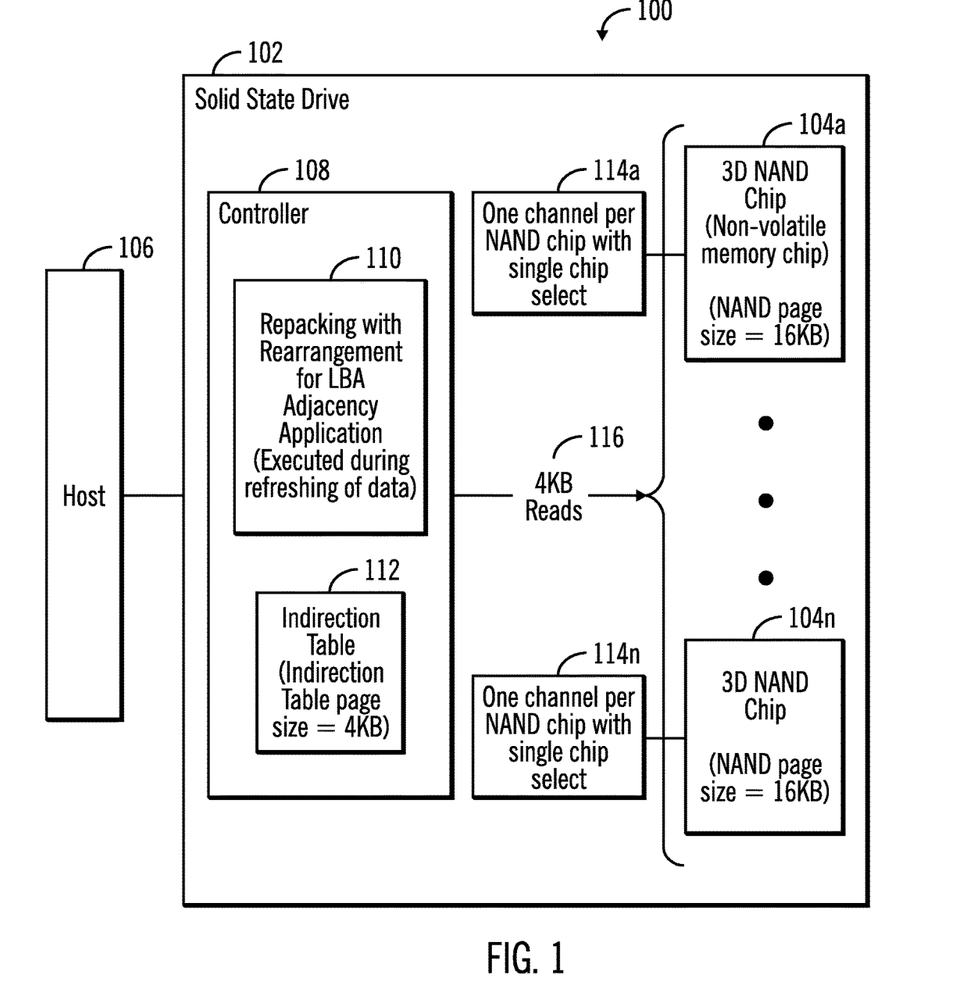
FIG. 1 illustrates a block diagram of a computing environment in which a SSD with 3D NAND chips is coupled to a host, in accordance with certain embodiments.

FIG. 1 illustrates a block diagram of a computing environment 100 in which a solid state drive 102 with a plurality of 3D NAND chips 104a ... 104n is coupled to a host 106, in accordance with certain embodiments. A chip (also referred to as a package) is comprised of a plurality of NAND devices, where each NAND device controls a plurality of dies. The embodiments described in FIG. 1 may also be applied to high capacity MLC NAND chips.

The solid state drive 102 may be comprised of non-volatile memory, such as NAND memory, NOR memory or some other suitable non-volatile memory. In certain embodiments, the solid state drive 102 may be capable of storing several terabytes of data or more. Certain embodiments may be applied to other types of non-volatile memory, phase change memory (PCM), a three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRANI, byte addressable random access non-volatile memory, etc.

In certain embodiments, the host 106 may be comprised of any suitable computational device, such as a personal computer, a mainframe, a telephony device, a smart phone, a storage controller, a blade computer, a processor with memory, etc. In certain alternative embodiments, the computational device 106 may communicate with the SSD 102 over a bus (such as a Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc. Further details of the SATA specification may be found in the publication titled "Serial ATA Specification, Revision 3.2," released August 2013, by SATA International Organization (SATA-IO), Beaverton, Oreg. In another example, the interface and/or interconnect protocol may comply and/or be compatible with an NVMe (Non-Volatile Memory Host Controller Interface Express). Further details of NVMe may be found in the publication titled "NVM Express™, Revision 1.2," released Nov. 3, 2014 by NVM Express™ Work Group, and/or earlier and/or later versions of this specification (NVM Express is a trademark of NVM Express, Inc.).

In certain embodiments, the solid state drive 102 may be included in a computational device (not shown) having an operating system that interacts with the solid state drive 102 to perform I/O operations. The operating system may use a page size of 4 KB.

The 3D NAND chips 104a ... 104n may each have a page size of 16 KB, whereas the host 106 may use a page size of 4 KB for read operations. In other words, the file system cluster/node size is 4 KB where the file system cluster/node corresponds to the unit of granularity of space allocated by the file system, and the NAND page size is 16 KB where a NAND page is the unit of granularity of a write to a NAND. The page size of 16 KB for the 3D NAND chips means that when data is requested at least one page of 16 KB is returned. For example, when a 4 KB read request is made to a NAND chip at least 16 KB of data is returned.

The solid state drive 102 includes a controller 108 implemented in firmware, hardware, software or any combination thereof. The controller 108 includes an application 110 that is also referred to as a repacking with rearrangement for logical block address (LBA) adjacency application. The repacking with rearrangement for LBA adjacency is executed during the refreshing of data. The controller 108 also includes an indirection table 112 that uses a page size of 4 KB.

In certain embodiments, in the solid state drive 102 there may be only one channel per 3D NAND chip with a single chip select (reference numerals 114a ... 114n) and as a result parallelism may not be possible in read operations from each 3D NAND chip of the plurality of 3D NAND chips 104a ... 104n. In other embodiments, planar parallelism may be possible. In certain embodiments due to large die capacities, on an 8 channel controller, there are 1 or less dies per channel and hence even when a 128 KB request is made, the concurrency may not be greater than 5. So if the data is not packed, then in certain embodiments the ability to read may be 4 KB times 5, i.e., 20 KB at a time. If the data is packed, then potentially a system may be able to obtain 16 KB times 5, i.e., 80 KB at a time. The controller 108 requests read operations with a page size of 4 KB (reference numeral 116) or a multiple of 4 KB, whereas the 3D NAND chips 104a ... 104n represent data in a page size of 16 KB.

In certain embodiments shown in FIG. 1, the controller 108 of the solid state drive 102 periodically initiates a repacking of data stored in the 3D NAND chips 104a ... 104n of the solid state drive 102 during the time the data refresh is performed. In certain embodiments, during each repacking of data, logical blocks are placed physically contiguously in an increasing order in pre-erased locations of the 3D NAND chips 104a ... 104n of the solid state drive 102. Subsequently, when read requests are received by the solid state drive 102 from the host 106 for a plurality of logical blocks, then in response to determining that the plurality of logical blocks are stored physically contiguously in an increasing order, the controller 108 dispatches a single request to the one or more 3D NAND chips (non-volatile memory chips) 104a ... 104n of the solid state drive 102 to fetch the plurality of logical blocks stored physically contiguously in an increasing order.

Figure 2:
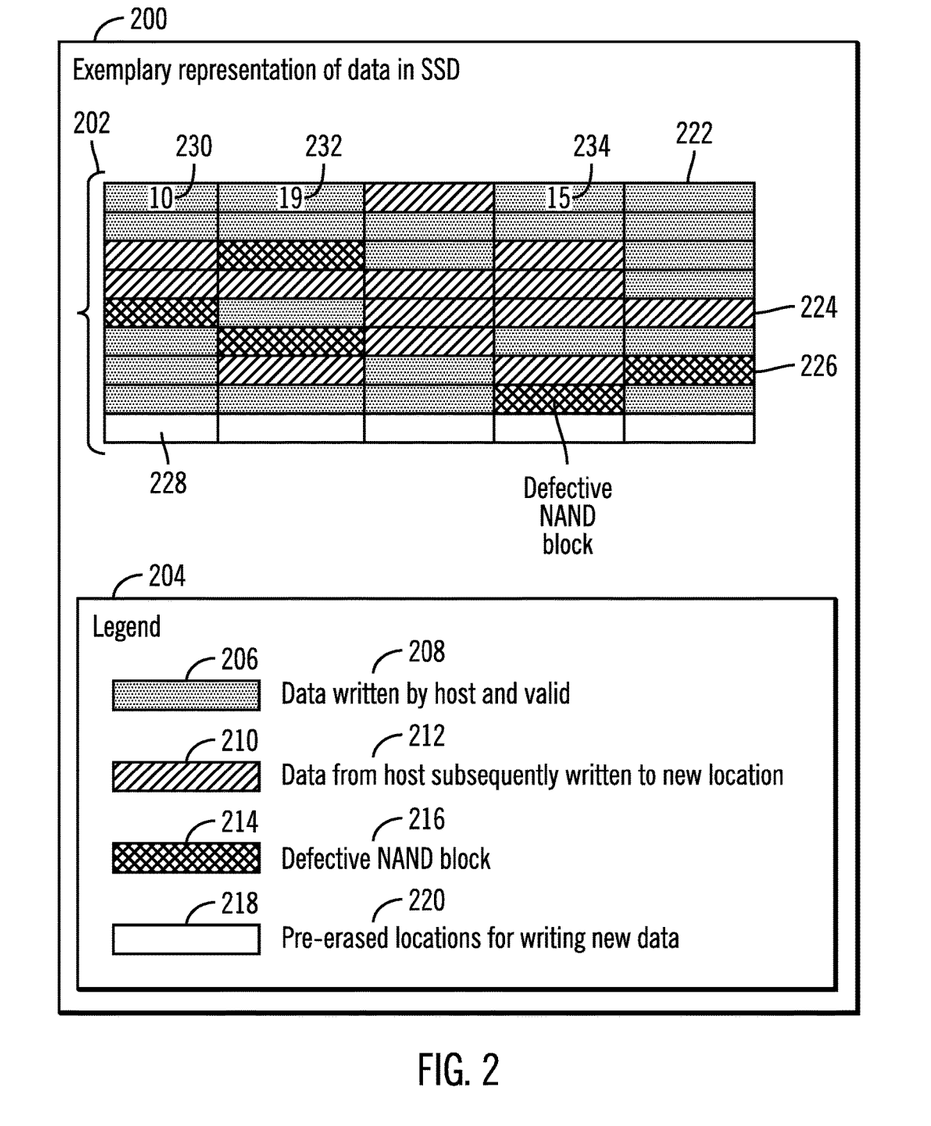
FIG. 2 illustrates a block diagram that shows an illustrative representation of data in a SSD, in accordance with certain embodiments.

FIG. 2 illustrates a block diagram 200 that shows an illustrative representation 202 of data in a solid state drive, in accordance with certain embodiments. The legend 204 shows that the uniform gray region 206 represents data written by the host 106 where the data is valid data. The slanted hatched region 210 represents data from host that has been subsequently written to a new location 212. The crossed hatched region 214 represents defective NAND blocks 216. The white region 218 represents pre-erased locations for writing new data 220.

In accordance with the legend 204, in the illustrative representation 202, reference numeral 222 shows data written by the host 106, where the written data is valid, reference numeral 224 shows data from host 106 subsequently written to a new location, reference numeral 226 shows a defective NAND block, and reference numeral 228 shows a pre-erased location for writing new data. In the illustrative representation 202 of data, reference numerals 230, 232, and 234 show logical block addresses 10, 19, and 15 as valid data written by the host. It may be noted that each of the logical block addresses shown via reference numerals 230, 232, 234 represents 16 KB of data as the page size of the 3D NAND chips 104a ... 104n in the solid state drive 102 is 16 KB.

Figure 3:
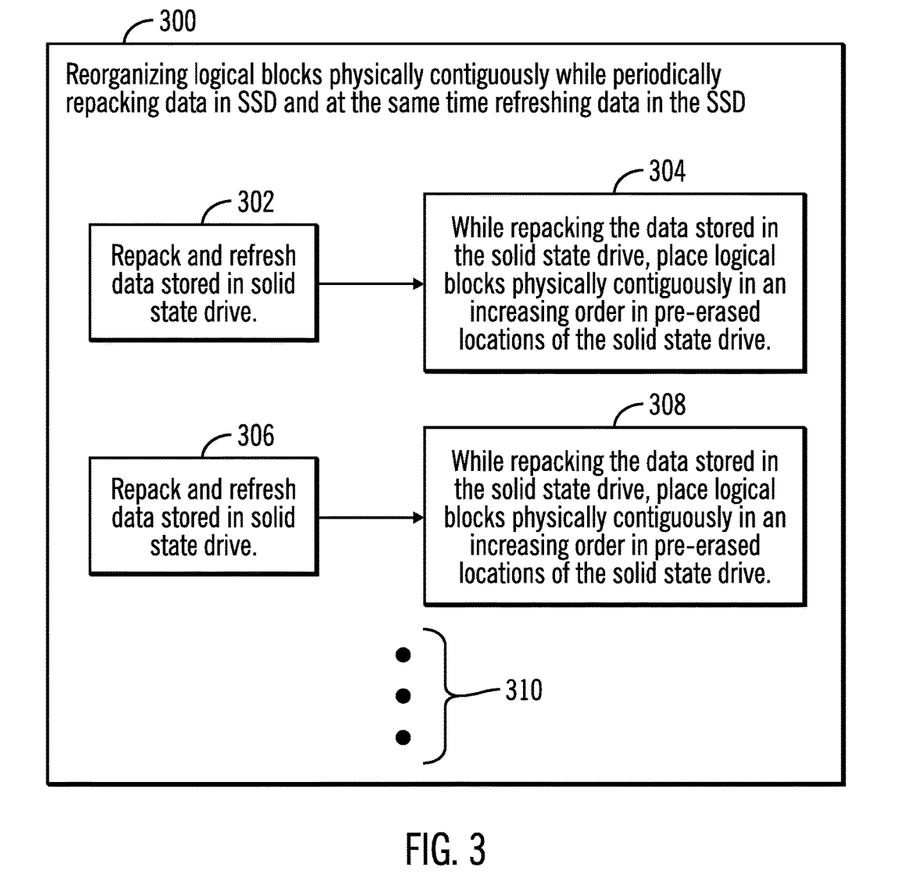
FIG. 3 illustrates a block diagram that shows reorganizing logical blocks physically contiguously while periodically repacking data in a SSD while at the same time refreshing data in the SSD, in accordance with certain embodiments.

FIG. 3 illustrates a block diagram 300 that shows the reorganizing of logical blocks physically contiguously while periodically repacking data in a solid state drive 302 while at the same time refreshing data in the SSD, in accordance with certain embodiments. Existing SSDs have "data refresh" where the data has to rewritten periodically to prevent data loss due to charge loss in NAND cells The initial repacking and refreshing of data in the solid state drive 302 is shown via reference numeral 302. During the initial repacking of data in the solid state drive 302, logical blocks are placed physically contiguously in an increasing order in pre-erased locations of the solid state drive (as shown via reference numeral 304). Subsequently, after the elapse of a period of time another repacking and refreshing of data is initiated (reference numeral 306) and while repacking the data stored in the solid state drive 102, logical blocks are placed physically contiguously in an increasing order in pre-erased locations of the solid state drive 102 (shown via reference numeral 308). The process of repacking of data at periodic intervals and while repacking the data placing logical blocks continuously in an increasing order in pre-erased locations of the solid state drive continues (as shown via reference numeral 310).

In certain embodiments the operations of placing logical blocks contiguously in an increasing order in pre-erased locations of the solid state drive 102 is performed during repacking to improve the read performance of solid state drives, where the repacking is performed at the same time the refreshing of the solid state drive 102 is being performed. Therefore, the embodiments are not just a method to repack data. The embodiments perform both data repack and charge loss prevention. Prior art methods for "data refresh technology" to prevent charge loss is known. Essentially, in certain embodiments, data repacking comes in for "free" at the time of data refreshing without significant added burden in terms of endurance loss or power or other factors.

Figure 4:
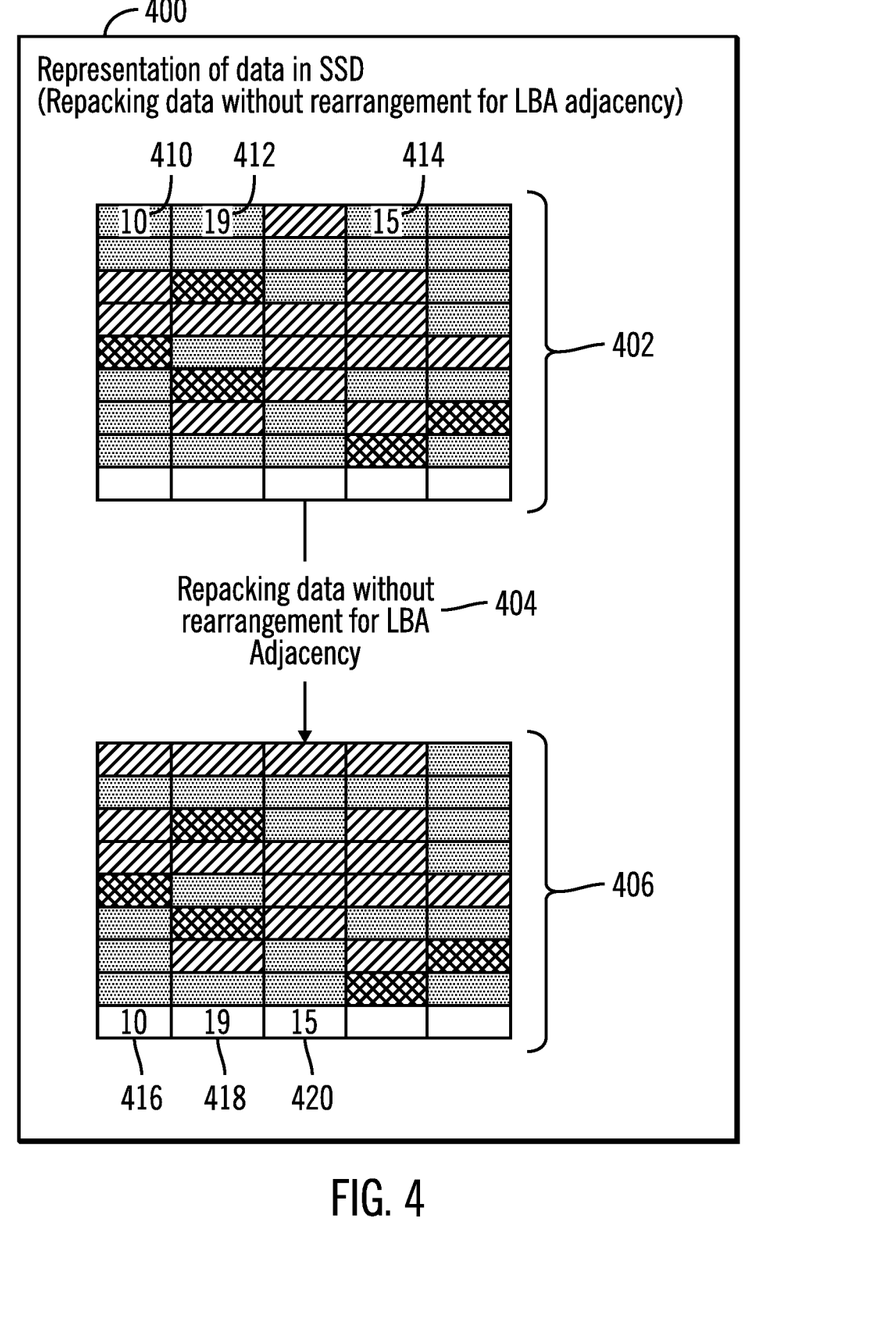
FIG. 4 illustrates a block diagram that shows repacking of data without rearrangement of data for logical block address adjacency, in accordance with certain embodiments.

FIG. 4 illustrates a block diagram 400 that shows repacking of data without rearrangement of data for logical block address adjacency as performed in certain prior art solid state drives, in accordance with certain embodiments.

In FIG. 4, an initial configuration of the data is shown via reference numeral 402, and configuration after repacking data without rearrangement for logical block address adjacency (reference numeral 404) is shown via reference numeral 406. It may be seen that logical block addresses 10, 19, 15 (represented by reference numerals 410, 412, 414) are moved physically contiguously to the pre-erased locations 416, 418, 420 during repacking of data, however the logical block addresses after being repacked are not in increasing order of adjacency, where increasing order of adjacency means that logical blocks x, x+1, x+2 and so on are placed one after another in sequence (e.g., blocks indicated by logical block addresses 15, 16, 17, 18, 19, 20 would be stored sequentially in pre-erased locations without any intervening gaps or blocks between them). By adding a data repacking technique to the existing data refresh, certain embodiments generate both refreshed NAND cells as well as nicely packed data content.

Since the logical block addresses are not rearranged in an increasing order of adjacency during repacking of data, if the host 106 requests a read of a plurality of contiguous pages from the solid state drive 102, multiple fetches may have to be performed from the 3D NAND chips 104a . . . 104n when the requested plurality of contiguous pages are spread across a plurality of 16 KB logical blocks on the 3D NAND chips 104a . . . 104n, and this causes a performance slowdown for read operations. For example, the host may request 12 pages starting from a logical address x where each page is 4 KB. The 12 pages require at least 48 KB of storage space on the 3D NAND chips 104a . . . 104n, i.e., the 12 pages may be stored in three 16 KB NAND pages, as the NAND page size is 16 KB. However, if the three 16 KB NAND pages are not placed in an increasing order of adjacency, the three pages have to be fetched one by one by sending three fetch commands from the controller 106 to the 3D NAND chips 104a . . . 104n, and this impacts the performance of read operations.

Figure 5:
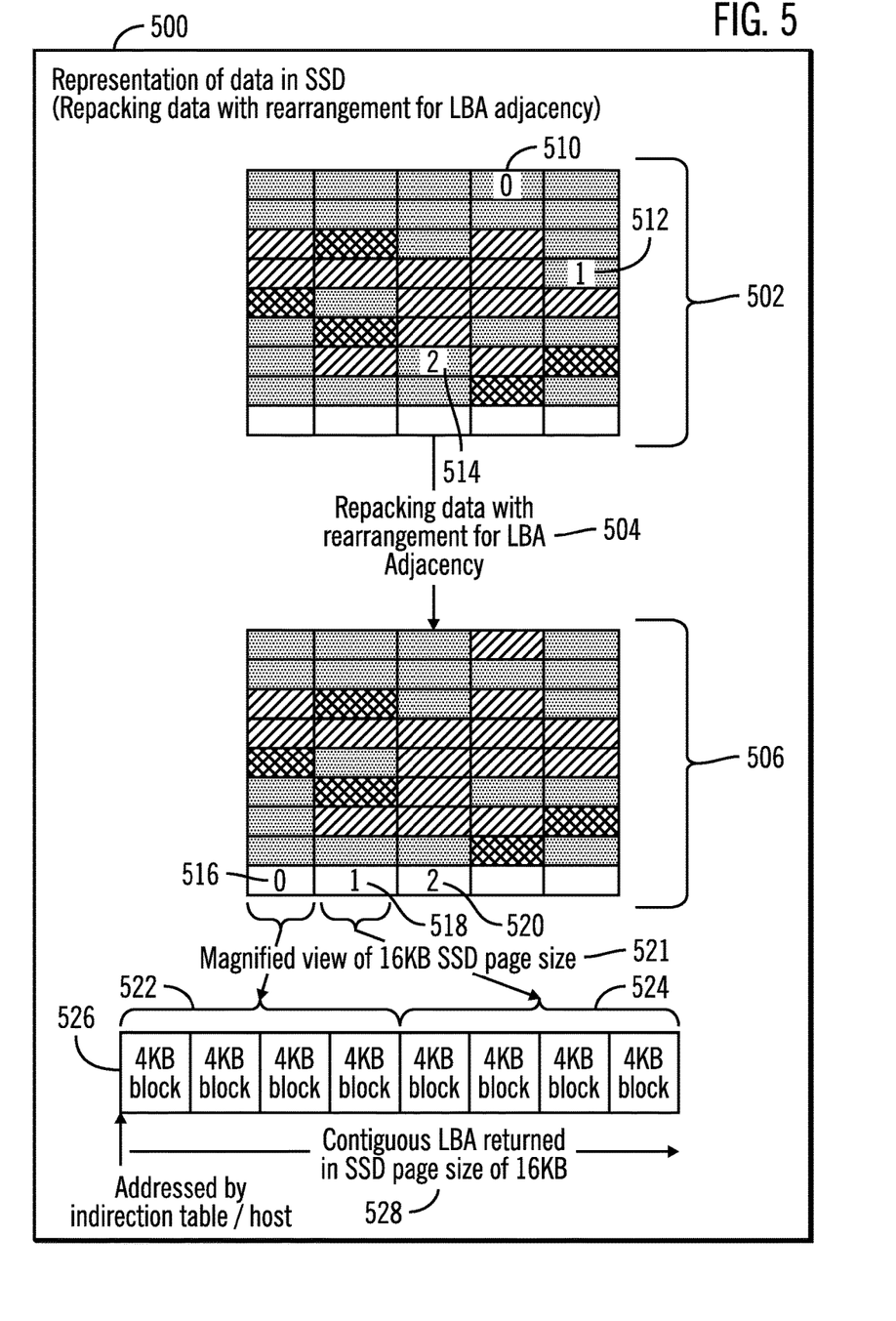
FIG. 5 illustrates a block diagram that shows repacking of data with rearrangement of data for logical block address adjacency, in accordance with certain embodiments.

FIG. 5 illustrates a block diagram 500 that shows repacking of data with rearrangement for logical block address adjacency, in accordance with certain embodiments.

In FIG. 5, an initial configuration of the data is shown via reference numeral 502, and configuration after repacking data with rearrangement for logical block address adjacency (reference numeral 504) is shown via reference numeral 506. It may be seen that logical block addresses 0, 1, 2 (represented by reference numerals 510, 512, 514)) are moved physically contiguously to the pre-erased locations 516, 518, 520 during repacking of data, and logical block addresses after being repacked are in increasing order of adjacency, where increasing order of adjacency means that logical blocks x, x+1, x+2 and so on are placed one after another in sequence (i.e., logical block addresses 15, 16, 17, 18, 19, 20 may be stored sequentially in pre-erased locations without any intervening gaps or logical block addresses between them.)

Since the logical block addresses are rearranged in an increasing order of adjacency during repacking of data, if the host 106 requests a read of a plurality of contiguous pages from the solid state drive 102, only a single fetch may have to be performed from the 3D NAND chips 104a . . . 104n when the requested plurality of contiguous pages are spread across a plurality of 16 KB logical blocks on the 3D NAND chips 104a . . . 104n, and this causes a performance enhancement for read operations.

For example, the host 106 may request 8 pages starting from a logical address "0" where each page is 4 KB. The 8 pages require at least 32 KB of storage space on the 3D NAND chips 104a . . . 104n, i.e., the 8 pages may be stored in two 16 KB NAND pages, as the NAND page size is 16 KB. Since the two 16 KB NAND pages are placed in an increasing order of adjacency (reference numeral 516, 518), the two pages do not have to be fetched one by one by sending two fetch commands from the controller to the 3D NAND chips 104a . . . 104n. Instead a single fetch commend for two pages starting logical address "0" may return the pages 516, 518 to satisfy the read request. This is shown via a magnified view of the 16 KB solid state drive page size (reference numeral 521) which stores eight 4 KB pages, where 4 KB is the host and indirection table page size. The indirection table 112 may address the first 4 KB block 526 and request that 32 KB of data be returned starting from the first 4K block 526. In certain embodiments, the 32 blocks of physically contiguous logical block addresses arranged in an increasing adjacency order are returned via a single fetch by the controller 108 from the 3D NAND chips 104a . . . 104n (as shown via reference numeral 528). The single fetch performed in embodiments illustrated by FIG. 5 enhances the read performance in comparison to the multiple fetches that had to be performed in the mechanisms shown in FIG. 4. In certain embodiments (e.g., in embodiments where the SSD is 200 GB, each NAND die is 48 GB, and thus 5 dies are used in the 200 GB SSD), due to large die capacities, on an 8 channel controller, there may be 1 or fewer dies per channel and hence even when there is a 128 KB request, the concurrency may not be greater than 5. So if the data is not packed, then a system may end up with an ability to read 4 KB times 5, i.e., 20 KB at a time, in certain embodiments. If the data is packed, then it may be possible to get 16 KB times 5, i.e., 80 KB at a time. Therefore the relative read performance may be 400% in comparison to the read performance when the data is not packed. Future generations of NANDs are doubling in capacity per die (e.g., from 48 GB to 96 GB per die). So this 400% relative read performance is very useful. It should be noted that the 400% relative read performance is for a 1 plane read in the 3D NAND. For client usage model, and for the first generation of 3D NAND, the 400% read performance may be adequate, and there may be no need to add the complexity for quad plane handling in 3D NANDs (quad plane handling in 3D NANDs is described later in FIG. 8, and in quad plane handling four reads may be handled in parallel by a quad plane 3D NAND). In certain embodiments for a second generation NAND, quad plane reads may be possible (to be described later in FIG. 8) and a 1600% relative read performance may be obtained.

Figure 6:
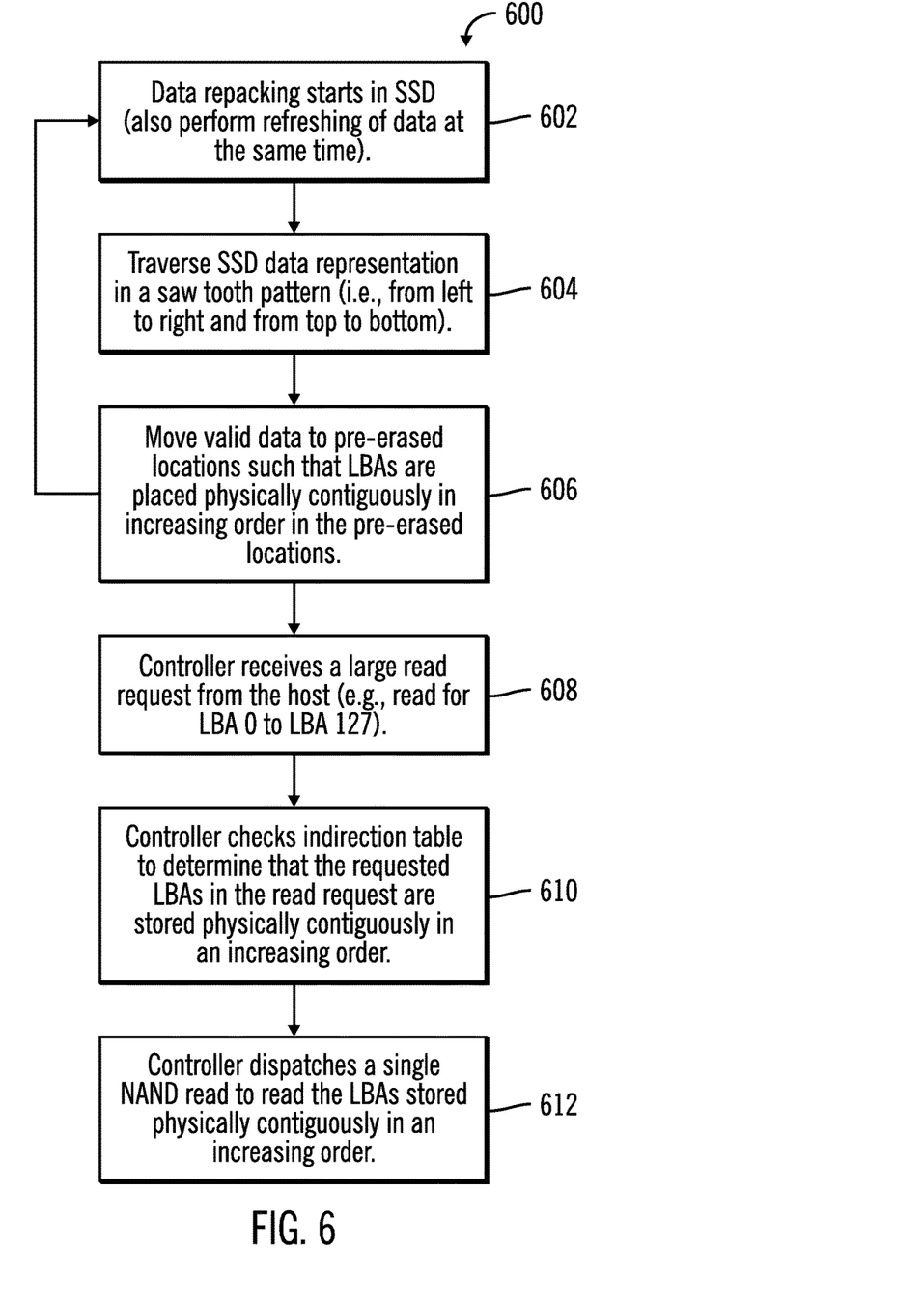
FIG. 6 illustrates a first flowchart for repacking and organizing logical blocks physically contiguously in an increasing order in solid state drives for improved response to read requests while at the same time refreshing data, in accordance with certain embodiments.

FIG. 6 illustrates a first flowchart 600 for repacking and organizing logical blocks physically contiguously in an increasing order in solid state drives for improved response to read requests, while at the same time refreshing the data in the solid state drives. The operations shown in FIG. 6 may be performed by application 110 that executes in the controller 108 of the solid state drive 102, where the application 110 uses the indirection table 112.

Control starts at block 602 in which data repacking starts in the solid state drive 102, and in certain embodiments the refreshing of data is performed simultaneously with the data repacking. Control proceeds to block 604 in which the application 110 traverses the solid state data representation (e.g., 502) in a saw tooth pattern (i.e., from left to right and from top to bottom). Valid data is moved (at block 606) to pre-erased locations such that logical block addresses are placed physically contiguously in increasing order in the pre-erased locations. From block 606 control may return to block 602 after a period of time to perform another round of repacking of data.

From block 606, control may also proceed to block 608 after a period of time. The controller 108 may receive (at block 608) a larger read request from the host 106. The controller 108 checks (at block 610) the indirection table 112 to determine that the requested logical block addresses in the read request are stored physically contiguously in an increasing order. The controller 108 then dispatches (at block 612) a single NAND read in order to read the logical block addresses stored physically contiguously in an increasing order in the 3D NAND chips 104a . . . 104n.

Thus FIGS. 5, 6 illustrate certain embodiments to use a single fetch to read a plurality of NAND pages of 16 KB each, to satisfy a large read request from a host that has a page size of 4 KB, where the large read request requests more than 16 KB of data. For example, if 32 KB of data is requested by the host 106 then two NAND pages may be retrieved via a single fetch request made by the controller 106 to the plurality of NAND chips 104a . . . 104n. In certain embodiments, the fetch request needs the starting logical address for the fetch and the number of pages to be fetched. In other embodiments, the fetch request just needs the starting logical address for the fetch and pages keep on getting read starting from the starting logical address.

Figure 7:
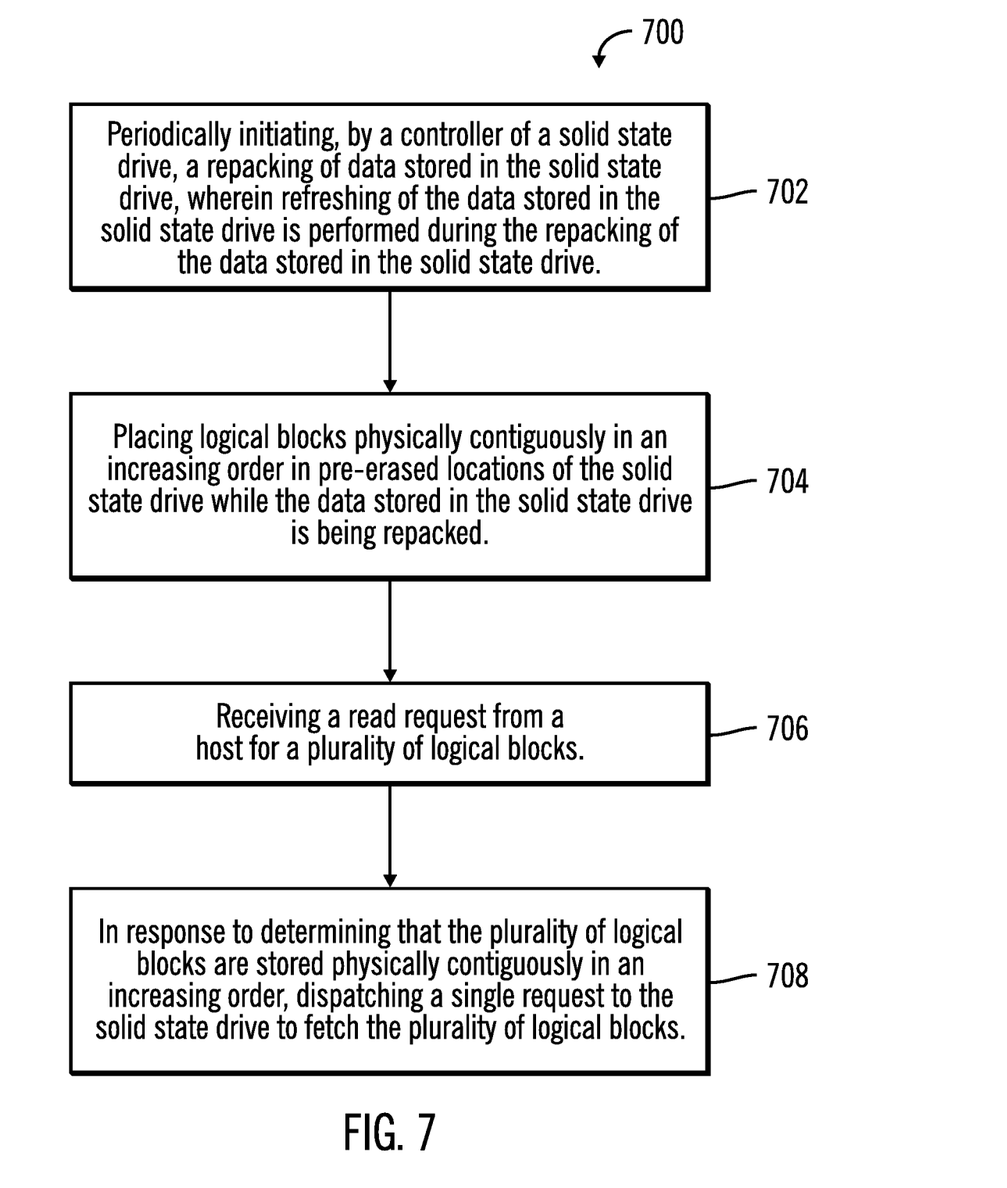
FIG. 7 illustrates a second flowchart for repacking and organizing logical blocks physically contiguously in an increasing order in solid state drives for improved response to read requests while at the same time refreshing data, in accordance with certain embodiments.

FIG. 7 illustrates a second flowchart 700 for repacking and organizing logical blocks physically contiguously in an increasing order in solid state drives for improved response to read requests. The operations shown in FIG. 7 may be performed by application 110 that executes in the controller 108 of the solid state drive 102, where the application 110 uses the indirection table 112.

Control starts at block 702 in which a controller 108 of a solid state drive 102 initiates a periodic repacking of data stored in the solid state drive 102, wherein refreshing of the data stored in the solid state drive is performed during the repacking of the data stored in the solid state drive 102. Logical blocks are placed (at block 704) physically contiguously in an increasing order in pre-erased locations of the solid state drive 102 while the data stored in the solid state drive 102 is being repacked.

Control proceeds to block 706 in which a read request is received from a host 106 for a plurality of logical blocks. In response to determining that the plurality of logical blocks are stored physically contiguously in an increasing order, a single request is made to the non-volatile memory chips 104a . . . 104n of the solid state drive 102 to fetch the plurality of logical blocks.

In certain embodiments, the host 106 represents logical blocks in a smaller size than the solid state drive 102. An indirection table 112 in the solid state drive 102 maintains pointers to most recent copies of valid data stored in the solid state drive 102, and the indirection table 112 represents the plurality of logical blocks in a same size as the host 106. In certain embodiments, the solid state drive 102 is comprised of three-dimensional NAND chips 104a . . . 104n, and there is only one channel per three-dimensional NAND chip with only one chip select and parallel read requests cannot be handed by the only one channel. Furthermore, in certain embodiments, a NAND page size is 16 KB and requests from a host 106 to the solid state drive 102 are made in page sizes of 4 KB. In certain embodiments, NAND chips may have "planar" parallelism in addition to the 16 KB page. For example, certain NANDs have 4 planes, resulting in 64 KB of data that may be read in the same time duration as 4 KB resulting in 1600% read bandwidth relative to reads of scattered 4 KB data.

In certain embodiments, the repacking of data in the solid state drive 102 is performed periodically, and the placing of the logical blocks physically contiguously in an increasing order in the pre-erased locations of the solid state drive 102 is performed during each periodic repacking of the data in the solid state drive 102 during a data refresh. The placing of the logical blocks physically contiguously in an increasing order in the pre-erased locations of the solid state drive 102 while the data stored in the solid state drive 102 is being repacked improves read performance in comparison to the placing of the logical blocks physically contiguously in a random order in the pre-erased locations of the solid state drive 102 while the data stored in the solid state drive 102 is being repacked.

In prior art, the internal indirection system of the indirection table 112 is 4K generally resulting in each 4K being on a different erase block. A 64 KB host read would result in sixteen 4K reads dispatched to different NAND blocks. Certain embodiments illustrated in FIGS. 1-7 repack data such that "logical block address 0" to "logical block address N" are placed adjacent to each other in NAND. Existing NAND policy to provide data retention, background data refresh, may be repurposed to not just refresh data but also pack the data physically contiguously. Doing so would cause a minor increase in write amplification due to velocity mixing but since the actual available endurance is far more than required to meet the three year usage model for solid state drives, this would be an appropriate trade-off for increasing read performance.

Figure 8:
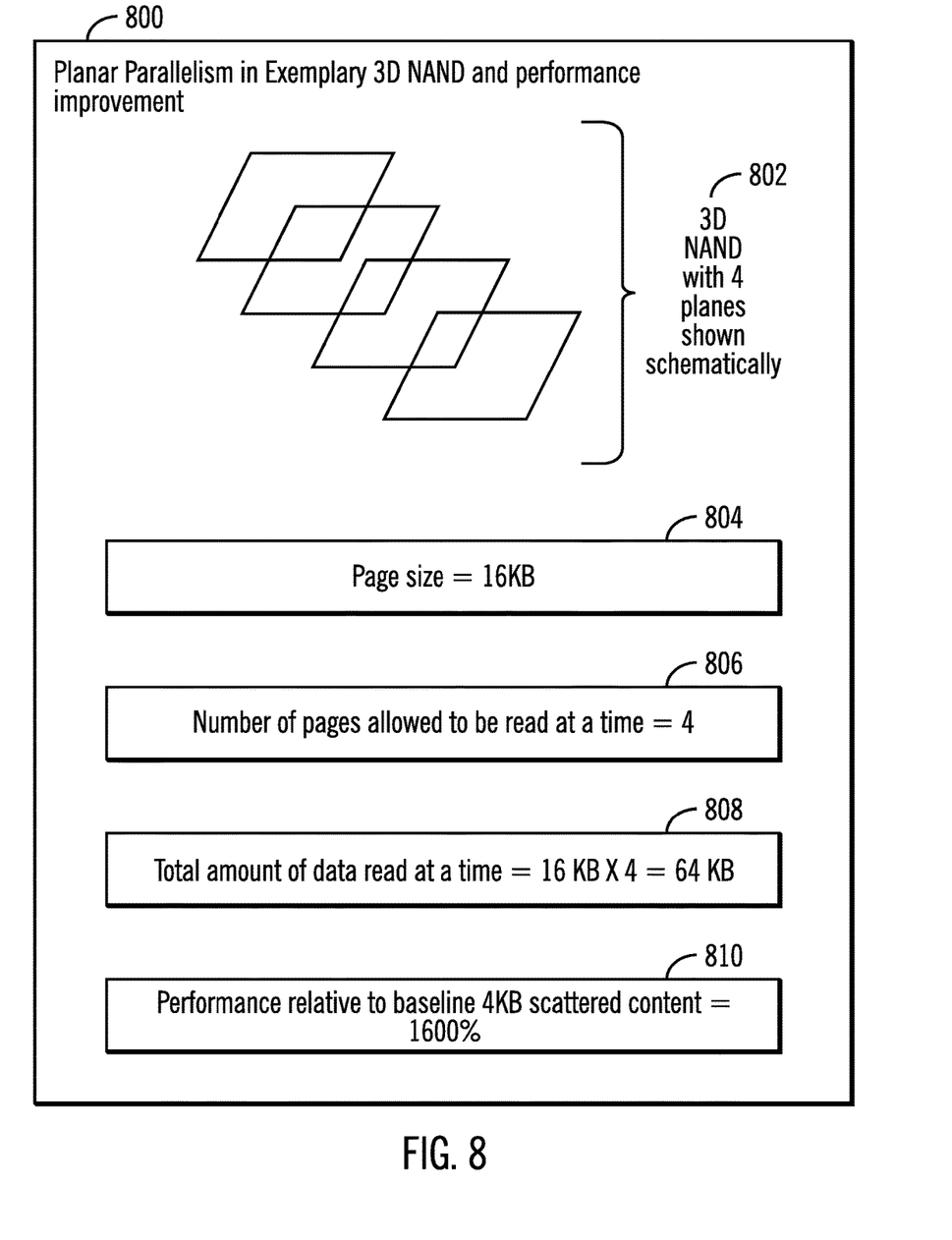
FIG. 8 illustrates a block diagram showing planar parallelism in an exemplary 3D NAND and exemplary performance improvement when four pages are allowed to be read at the same time, in accordance with certain embodiments.

FIG. 8 illustrates a block diagram 800 showing planar parallelism in an exemplary 3D NAND and exemplary performance improvement when four pages are allowed to be read at the same time, in accordance with certain embodiments.

A schematic diagram of an example 3D NAND with 4 planes is shown via reference numeral 802. The page size for the 3D NAND with 4 planes is 16 KB (reference numeral 804). In certain embodiments, the number of pages that are allowed to be read at a time in the 3D NAND with 4 planes is four (as shown via reference numeral 806). Therefore, the total amount of data read at a time is 16 KB times 4 which is 64 KB (shown via reference numeral 808). Hence the performance relative to a situation where 4 KB scattered content is placed in an SSD is up to 16 times, i.e., if the performance in a situation where the SSD stores 4 KB scattered content is 100% then in the 3D NAND with a 16 KB page size where four pages can be read at a time the performance is 1600%.

Therefore FIG. 8 illustrates planar parallelism in an exemplary 3D NAND to achieve a performance that is 1600% of the performance in a situation in which 4 KB scattered content is stored.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 9:
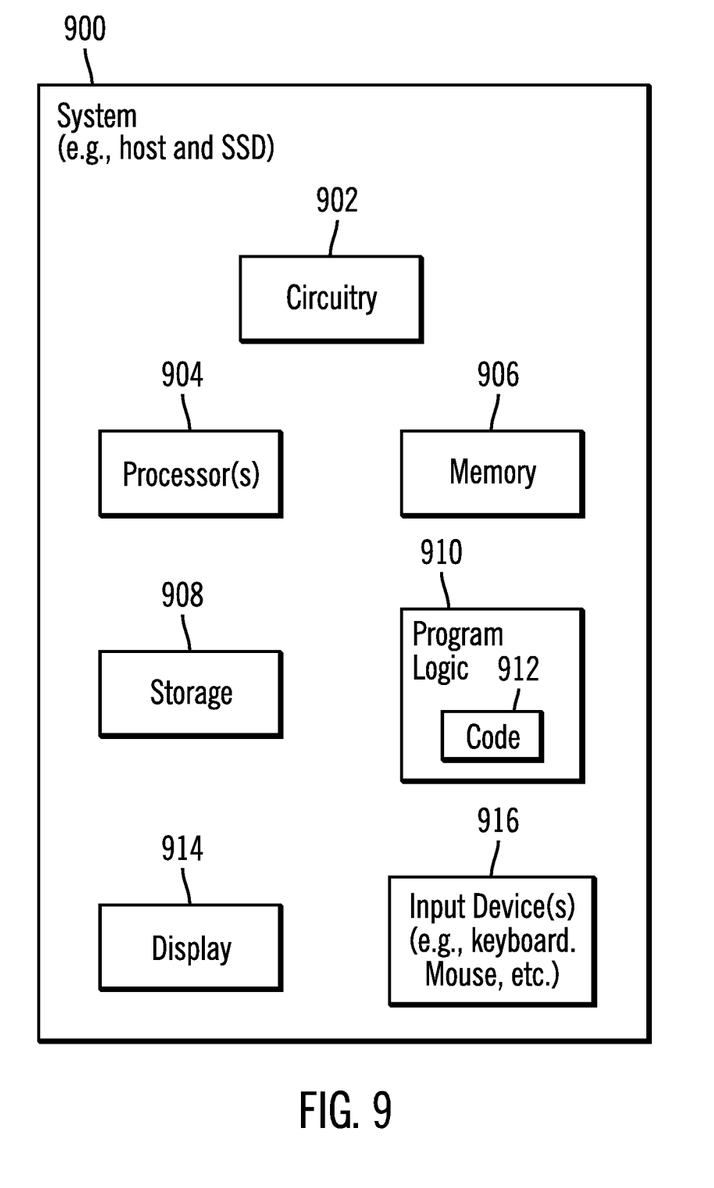
FIG. 9 illustrates a block diagram of computational device, in accordance with certain embodiments.

FIG. 9 illustrates a block diagram of a system 900 that includes both the host 106 (the host 106 comprises at least a processor) and the solid state drive 102, in accordance with certain embodiments. For example, in certain embodiments the system 900 may be a computer (e.g., a laptop computer, a desktop computer, a tablet, a cell phone or any other suitable computational device) that has the host 106 and the solid state drive 102 both included in the system 900. For example, in certain embodiments the system 900 may be a laptop computer that includes the solid state drive 102. The system 900 may include a circuitry 902 that may in certain embodiments include at least a processor 904. The system 900 may also include a memory 906 (e.g., a volatile memory device), and storage 908. The storage 908 may include the solid state drive 102 or other drives or devices including a non-volatile memory device (e.g., EEPROM, ROM, PROM, RAM, DRAM, SRAM, flash, firmware, programmable logic, etc.). The storage 908 may also include a magnetic disk drive, an optical disk drive, a tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902. The system 900 may also include a display 914 (e.g., an liquid crystal display (LCD), a light emitting diode (LED) display, a cathode ray tube (CRT) display, a touchscreen display, or any other suitable display). The system 900 may also include one or more input devices 916, such as, a keyboard, a mouse, a joystick, a trackpad, or any other suitable input devices). Other components or devices beyond those shown in FIG. 9 may also be found in the system 900.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

Examples

The following examples pertain to further embodiments.

Example 1 is a method for improving performance of a solid state drive. A controller of the solid state drive initiates a repacking of data stored in a non-volatile memory in the solid state drive, wherein refreshing of the data stored in the non-volatile memory of the solid state drive is performed during the repacking of the data stored in the non-volatile memory of the solid state drive. Logical blocks are placed physically contiguously in an increasing order in pre-erased locations of the non-volatile memory of the solid state drive while the data stored in the non-volatile memory of the solid state drive is being repacked.

In example 2, the subject matter of example 1 may include receiving a read request from a host for a plurality of logical blocks; and in response to determining that the plurality of logical blocks are stored physically contiguously in an increasing order, dispatching a single request to one or more non-volatile memory chips of the solid state drive to fetch the plurality of logical blocks.

In example 3, the subject matter of example 2 may include that the logical blocks are represented in a smaller size in the host than in the solid state drive.

In example 4, the subject matter of example 3 may include that an indirection table in the solid state drive maintains pointers to physical addresses of most recent copies of valid data stored in the solid state drive, wherein the indirection table represents the plurality of logical blocks in a same size as the host.

In example 5, the subject matter of example 1 may include that the solid state drive is comprised of three-dimensional NAND chips, wherein there is only one channel per three-dimensional NAND chip with only one chip select and parallel read requests cannot be handed by the only one channel.

In example 6, the subject matter of example 5 may include that a NAND page size is 16 Kilobytes and requests from a host to the solid state drive are made in page sizes of 4 Kilobytes.

In example 7, the subject matter of example 1 may include that the repacking of data in the solid state drive is performed periodically, wherein the placing of the logical blocks physically contiguously in an increasing order in the pre-erased locations of the non-volatile memory of the solid state drive is performed during each periodic repacking of the data in the solid state drive.

In example 8 the subject matter of example 1 may include that the placing of the logical blocks physically contiguously in an increasing order in the pre-erased locations of the non-volatile memory of solid state drive while the data stored in the non-volatile memory of the solid state drive is being repacked improves read performance in comparison to the placing of the logical blocks physically contiguously in a random order in the pre-erased locations of the non-volatile memory of solid state drive while the data stored in the non-volatile memory of the solid state drive is being repacked, wherein relative read performance is up to 1600% when planar parallelism is supported by the solid state drive with four pages allowed to be read at a time.

Example 9 is an apparatus, comprising: a plurality of non-volatile memory chips; and a controller coupled to the plurality of non-volatile memory chips, wherein the controller is operable to initiate, a repacking of data stored in the plurality of non-volatile memory chips, wherein refreshing of the data stored in the plurality of non-volatile memory chips is performed during the repacking of the data stored in the plurality of non-volatile memory chips; and place logical blocks physically contiguously in an increasing order in pre-erased locations of the plurality of non-volatile memory chips while the data stored in the plurality of non-volatile memory chips is being repacked.

In example 10, the subject matter of example 9 may include that the controller is further operable to: receive a read request from a host for a plurality of logical blocks; and in response to determining that the plurality of logical blocks are stored physically contiguously in an increasing order, dispatch a single request to one or more non-volatile memory chips to fetch the plurality of logical blocks.

In example 11, the subject matter of example 10 may include that the host represents logical blocks in a smaller size than the plurality of non-volatile memory chips.

In example 12, the subject matter of example 11 may include that an indirection table maintains pointers to physical addresses of most recent copies of valid data stored in the plurality of non-volatile memory chips, and wherein the indirection table represents the plurality of logical blocks in a same size as the host.

In example 13 the subject matter of example 9 may include that the plurality of non-volatile memory chips is comprised of three dimensional NAND chips, wherein there is only one channel per three-dimensional NAND chip with only one chip select and parallel read requests cannot be handed by the only one channel.

In example 14, the subject matter of claim 13 may include that a NAND page size is 16 Kilobytes and requests from a host to the apparatus are made in page sizes of 4 Kilobytes.

In example 15, the subject matter of example 9 may include that the repacking of data in the plurality of non-volatile memory chips is performed periodically, wherein the placing of the logical blocks physically contiguously in an increasing order in the pre-erased locations of the plurality of non-volatile memory chips is performed during each periodic repacking of the data in the plurality of non-volatile memory chips.

In example 16, the subject matter of example 9 may include that the placing of the logical blocks physically contiguously in an increasing order in the pre-erased locations while the data is being repacked improves read performance in comparison to the placing of the logical blocks physically contiguously in a random order in the pre-erased locations while the data is being repacked, and wherein relative read performance is up to 1600% when planar parallelism is supported by the apparatus with four pages allowed to be read at a time.

Example 17 is a system comprising: a solid state drive comprising a plurality of non-volatile memory chips; a display; and a processor coupled to the solid state drive and the display, wherein, the solid state drive is operable to: initiate, a repacking of data stored in the plurality of non-volatile memory chips, wherein refreshing of the data stored in the plurality of non-volatile memory chips is performed during the repacking of the data stored in the plurality of non-volatile memory chips; and place logical blocks physically contiguously in an increasing order in pre-erased locations of the plurality of non-volatile memory chips while the data stored in the plurality of non-volatile memory chips is being repacked.

In example 18, the subject matter of example 17 may include that the controller is further operable to: receive a read request from a host for a plurality of logical blocks; and in response to determining that the plurality of logical blocks are stored physically contiguously in an increasing order, dispatch a single request to one or more non-volatile memory chips to fetch the plurality of logical blocks.

In example 19, the subject matter of example 18 may include that the host represents logical blocks in a smaller size than the plurality of non-volatile memory chips.

In example 20, the subject matter of example 19 may include that an indirection table maintains pointers to physical addresses of most recent copies of valid data stored in the plurality of non-volatile memory chips, and wherein the indirection table represents the plurality of logical blocks in a same size as the host.

In example 21 the subject matter of example 17 may include that the plurality of non-volatile memory chips is comprised of three dimensional NAND chips, wherein there is only one channel per three-dimensional NAND chip with only one chip select and parallel read requests cannot be handed by the only one channel.

In example 22, the subject matter of example 21 may include that a NAND page size is 16 Kilobytes and requests from a host to the apparatus are made in page sizes of 4 Kilobytes.

In example 23, the subject matter of example 17 may include that the repacking of data in the plurality of non-volatile memory chips is performed periodically, wherein the placing of the logical blocks physically contiguously in an increasing order in the pre-erased locations of the plurality of non-volatile memory chips is performed during each periodic repacking of the data in the plurality of non-volatile memory chips.

In example 24, the subject matter of example 17 may include that the placing of the logical blocks physically contiguously in an increasing order in the pre-erased locations while the data is being repacked improves read performance in comparison to the placing of the logical blocks physically contiguously in a random order in the pre-erased locations while the data is being repacked, and wherein relative read performance is up to 1600% when planar parallelism is supported by the apparatus with four pages allowed to be read at a time.

What is claimed is:

1. A method for improving performance of a solid state drive, the method comprising:
   initiating, by a controller of the solid state drive, a repacking of data stored in a non-volatile memory of the solid state drive; and
   performing the repacking of the data stored in the non-volatile memory of the solid state drive to refresh the solid state drive.

2. The method of claim 1, wherein the repacking is performed by placing logical blocks with consecutive numerically indicated addresses sequentially, starting from a lower numbered address and ending at a higher numbered address.

3. The method of claim 2, wherein the logical blocks are represented in a smaller page size in a host than the solid state drive.

4. The method of claim 3, wherein an indirection table in the solid state drive maintains pointers to physical memory addresses of most recent copies of valid data stored in the solid state drive, and wherein the indirection table represents a plurality of logical blocks in a same page size as the host.

5. The method of claim 1, wherein the solid state drive is comprised of a plurality of non-volatile memory chips, wherein there is only one channel for each non-volatile memory chip of the plurality of non-volatile memory chips, wherein there is only one chip select for each non-volatile memory chip of the plurality of non-volatile memory chips, and wherein parallel read requests cannot be handled by the one channel.

6. The method of claim 5, wherein each page size is 16 Kilobytes and requests from a host to the solid state drive are made in page sizes of 4 Kilobytes.

7. The method of claim 1, wherein the repacking of data in the solid state drive is performed periodically, and wherein logical blocks are placed physically contiguously in an increasing order in pre-erased locations of the non-volatile memory of the solid state drive during each periodic repacking of the data in the solid state drive.

8. An apparatus, comprising:
   a plurality of non-volatile memory chips; and
   a controller coupled to the plurality of non-volatile memory chips, wherein the controller is operable to:
   initiate a repacking of data stored in the plurality of non-volatile memory chips; and
   perform the repacking of the data stored in the plurality of non-volatile memory chips to refresh the non-volatile memory chips.

9. The apparatus of claim 8, wherein the repacking is performed by placing logical blocks with consecutive numerically indicated addresses sequentially, starting from a lower numbered address and ending at a higher numbered address.

10. The apparatus of claim 9, wherein the logical blocks are represented in a smaller page size in a host than the non-volatile memory chips.

11. The apparatus of claim 10, wherein an indirection table maintains pointers to physical memory addresses of most recent copies of valid data stored in the plurality of non-volatile memory chips, and wherein the indirection table represents a plurality of logical blocks in a same page size as the host.

12. The apparatus of claim 8, wherein there is only one channel for each non-volatile memory chip of the plurality of non-volatile memory chips, wherein there is only one chip select for each non-volatile memory chip of the plurality of non-volatile memory chips, and wherein parallel read requests cannot be handled by the one channel.

13. The apparatus of claim 12, wherein each page size is 16 Kilobytes and requests from a host to the apparatus are made in page sizes of 4 Kilobytes.

14. The apparatus of claim 8, wherein the repacking of data in the plurality of non-volatile memory chips is performed periodically, and wherein logical blocks are placed physically contiguously in an increasing order in pre-erased locations of the non-volatile memory chips during each periodic repacking of the data in the plurality of non-volatile memory chips.

15. A system, comprising:
a solid state drive comprising a plurality of non-volatile memory chips;
a display; and
a processor coupled to the solid state drive and the display, wherein, the solid state drive is operable to:
initiate a repacking of data stored in the plurality of non-volatile memory chips; and
perform the repacking of the data stored in the plurality of non-volatile memory chips to refresh the non-volatile memory chips.

16. The system of claim 15, wherein the repacking is performed by placing logical blocks with consecutive numerically indicated addresses sequentially, starting from a lower numbered address and ending at a higher numbered address.

17. The system of claim 16, wherein the logical blocks are represented in a smaller page size in a host than the solid state drive.

18. The system of claim 17, wherein an indirection table maintains pointers to physical memory addresses of most recent copies of valid data stored in the plurality of non-volatile memory chips, and wherein the indirection table represents a plurality of logical blocks in a same page size as a host operating system.

19. The system of claim 15, wherein there is only one channel for each non-volatile memory chip of the plurality of non-volatile memory chips, wherein there is only one chip select for each non-volatile memory chip of the plurality of non-volatile memory chips, and wherein parallel read requests cannot be handed by the one channel.

20. The system of claim 15, wherein the repacking of data in the plurality of non-volatile memory chips is performed periodically, and wherein logical blocks are placed physically contiguously in an increasing order in pre-erased locations of the plurality of non-volatile memory chips during each periodic repacking of the data in the plurality of non-volatile memory chips.

* * * * *